United States Patent Office 3,813,354
Patented May 28, 1974

---

3,813,354
COPOLYMERS OF ALKENYLSULFONATES AND CATION PERMOSELECTIVE MEMBRANES BASED THEREON
Antonio Chiolle, Ferrara, Lino Credali, Casalecchio, Paolo Longi and Francesco Greco, Milan, and Romano D'Angelo, Brugherio, Italy, assignors to Montecatini Edison S.p.A., Milan and Rome, Italy
No Drawing. Filed July 5, 1972, Ser. No. 269,061
Claims priority, application Italy, July 8, 1971, 26,727/71
Int. Cl. C08f 15/02, 15/40
U.S. Cl. 260—2.2 R        17 Claims

ABSTRACT OF THE DISCLOSURE

Alkenylsulfonate copolymers, which, on heating, undergo self-cross-linking, and when so cross-linked, can be formed into cation permoselective membranes, said copolymers comprising, in chemically combined form: an alkenylsulfonate, vinylidene chloride and/or α-chloroacrylonitrile, and optionally, at least one other copolymerizable monomer containing a $CH_2=C<$ group.

BACKGROUND OF THE INVENTION

Field of the invention

The present invention relates to copolymers of alkenylsulfonates, cation permoselective membranes based thereon, and a process for the preparation of such membranes from said copolymers.

Prior art

Alkenylsulfonate polymers and copolymers are known. For example, alkenylsulfonates in very concentrated aqueous solutions or in dimethylsulfoxide may be polymerized in the presence of free radical initiators.

Under the same conditions, copolymers of alkenylsulfonates with certain vinyl monomers such as styrene, acrylonitrile, acrylamide, acrylic esters, vinylacetate and the like have been also prepared. Most of the copolymers made under such conditions are water soluble and thus their field of use is rather limited.

Attempts have been made to render some of these polymeric materials, particularly those based on alkenylsulfonates and acrylamide, water insoluble by employing known cross-linking agents such as formaldehyde, melamine/formaldehyde condensates, triazine aldehydes, cyclic ureas, polyepoxides and the like.

Using conventional techniques, cross-linking was effected on the already prepared copolymers of alkenylsulfonates using these substances. Using this technique, cross-linking bridges which are generally unstable to chemical reactants are formed between the polymer chains. These techniques, which require the presence of an external cross-linking agent, cause certain difficulties in the transformation of the polymeric materials into shaped articles such as films, membranes and other molded objects.

Because of the above-mentioned disadvantages, all the known polymers and copolymers of alkenylsulfonates can be used in the preparation of cation permoselective membranes only with great difficulty.

SUMMARY OF THE INVENTION

An object of the present invention is to provide copolymers of alkenylsulfonates which are free from the above-mentioned disadvantages.

Another object of the invention is to provide cation permoselective membranes comprising polymeric materials containing chemically combined alkenylsulfonates which are free from said disadvantages.

Still another object of this invention is to provide a process for the preparation of such membranes.

These and other objects are achieved using polymeric materials containing chemically combined alkenylsulfonates, said polymeric materials comprising linear copolymers of:

(A) At least one alkenylsulfonate of the formula (I):

$$[CH_2=CH-(CH_2)_n-SO_3]_zM \qquad (I)$$

wherein $n$ is 0 or 1; M is a mono-, di- or trivalent metal or a quaternary ammonium group of the formula:

wherein $R_1$, $R_2$, $R_3$ and $R_4$, are independently selected from the group consisting of hydrogen, cycloalkyl, aryl or heterocyclic groups; and Z is the valence of M;

(B) Vinylidene chloride and/or α-chloroacrylonitrile; and (C) Preferably, but not necessarily, other monomers copolymerizable therewith and containing a $CH_2=C<$ group.

When M is a metal, it may be, for example, lithium, sodium, potassium, calcium, magnesium, zinc, mercury manganese aluminum or iron; preferably sodium.

Examples of monomer (C), which may optionally be present in the copolymers of the present invention, are: acrylic and/or methacrylic acids, esters, amides and nitriles; vinylacetate and halo-vinylacetates; vinyl and vinylidene ketones; styrene, α-methylstyrene and dienes such as isoprene, 2,3-dimethylbutadiene or 2,3-dichlorobutadiene.

The copolymers according to the invention are generally water soluble when they contain more than 10 mol. percent of alkenyl-sulfonates. Moreover, they are generally soluble in polar solvents such as dimethylsulfoxide, dimethylformamide, hexamethyl phosphoramide, ethylene chlorohydrin and the like. The copolymers of the invention are insoluble in aliphatic hydrocarbons and are generally insoluble in aromatic hydrocarbons.

The presence of sulfonic acid groups renders these copolymers readily dyeable with basic dyes.

The linear copolymers which are an object of this invention may be prepared by copolymerization of the monomers in the presence of free radical initiators following conventional polymerization methods.

Preferably, the copolymerization of the alkenylsulfonates (A), with vinylidene chloride (or α-chloroacrylonitrile) (B), and the other monomers (C), if they are present, is carried out at 30–100° C., in solution, by employing, dimethylformamide, dimethylsulfoxide or pyridine and the like as a solvent, in the presence of a free radical polymerization initiator.

The preferred molar ratio of alkenylsulfonates to vinylidene chloride (or α-chloroacrylonitrile) is between 0.2 and 1.5.

The mole percent of alkenylsulfonate groups in the copolymers of the invention may vary over a wide range, for example, between 10 and 90%. However, the exact amount will depend on the particular use to which the copolymer is to be put.

The copolymers of the invention are characterized by an inherent viscosity (in suitable solvents at 30° C., concentration 0.25 g./100 cc. of solvent) which is preferably between 0.05 and 4 dl./g.

Following known molding and extrusion techniques, films, fibers and molded articles of any kind, size and shape may be obtained from either the present copolymers or solutions thereof.

It has surprisingly been found that under heating at temperatures higher than 120° C., these linear copolymers undergo cross-linking and are thus transformed into cross-linked, highly insoluble polymeric materials which are very scarcely swellable.

Thus, shaped articles can be prepared from the linear copolymers following known techniques adopted for polymeric thermoplastic materials. These articles, by simple heating at temperatures above 120° C., are transformed into non-deformable, insoluble molded objects in the same manner as in the case of thermosetting resins.

The novel copolymers of the invention are useful in all those areas where polymeric materials containing strongly acidic or highly polar groups are required, such as ion-exchange resins and finishing agents for textile, artificial, natural and synthetic fibers.

A particularly advantageous use of these copolymers is in polymeric membranes which are permoselective to cations.

The cation permoselective membranes of the invention comprise copolymers which are self-cross-linked by heating and which contain in a chemically combined form:

(A) At least one alkenylsulfonate of the formula (I);

(B) Vinylidene chloride and/or α-chloroacrylonitrile; and (C) Preferably, but not necessarily, other monomers copolymerizable therewith and containing a $CH_2=C<$ group.

The copolymers of the above described alkenylsulfonates may be used alone or, preferably, but not necessarily, in admixture with other polymeric materials containing double bonds and/or halogen atoms.

Among the alkenylsulfonates which can be used for the preparation of the membranes according to the invention, there are included ammonium, lithium, sodium, potassium, calcium, magnesium, zinc, mercury, manganese, aluminum or iron alkenylsulfonates.

Preferred alkenylsulfonates are sodium vinylsulfonate and sodium allylsulfonate.

Among the monomers of the type (C) which may optionally be used for the preparation of the membranes according to the invention, there are included acrylic and/or methacrylic acids, esters, amides and nitriles; vinyl esters such as vinyl acetate and vinyl propionate and their halo-derivatives; vinyl- and vinylidene ketones; styrene, α-methylstyrene and diolefins such as isoprene and 2,3-dimethylbutadiene and halogen-derivatives thereof.

A preferred group of such monomers includes acrylonitrile, vinyldichloroacetate, β-hydroxyethyl acrylate, methylvinylketone, methylisopropenylketone and styrene.

The membranes of the invention have several desirable characteristics; a moderate water absorption power, excellent mechanical properties, a high exchange capacity, a low electrical resistance and a high permoselectivity. Moreover, these membranes are insoluble in water and are characterized, with regard to ion-exchange, by a high degree of homogeneity, the ionically active ($SO_3M$) groups being homogeneously distributed throughout the membrane, since they are an integral part of a substituting group directly bound to the polymeric chains that constitute the membrane.

The membranes according to the invention comprise homogeneous, self-crosslinked (under heating) copolymers of an alkenylsulfonate, vinylidene chloride and/or α-chloro-acrylonitrile and, optionally, other monomers containing a $CH_2=C<$ group. The quantitative composition of the copolymers may vary over wide ranges, depending on the desired chemical, physical, electrical and mechanical characteristics.

The exchange capacity of the membrane depends on the alkenylsulfonate content; moreover, it is possible to regulate the degree of cross-linking and, thus, some mechanical, physical and chemical characteristics of the membranes, by suitably adjusting the content of vinylidene chloride and/or α-chloroacrylonitrile, and of the other monomer containing the $CH_2=C<$ groups, if such monomer is present; or by varying the temperature and/or the duration of the thermal treatment which causes cross-linking.

Copolymers particularly suited for the membranes according to the invention consist of polymeric materials containing, in a chemically combined form 5 to 95, preferably from 10 to 60 mol. percent of vinylidene chloride, from 5 to 80, preferably from 10 to 70 mol. percent of an alkylensulfonate and from 0 to 90, preferably from 0 to 60 mol. percent of one or more other copolymerizable monomers containing a $CH_2=C<$ group.

The polymeric materials have inherent viscosities (in suitable solvents at 30° C., concentration 0.25 g./100 cc. of solvent) preferably between 0.05 and 4.0 dl./g.

The membranes, which are permoselective to cations, are prepared from linear copolymers of alkenylsulfonates of the type described above, by a simple and economical process which, according to the invention, comprises, in order, the following steps:

(a) The preparation of a solution, in an organic solvent, of the linear, homogeneous copolymers of alkenylsulfonates, optionally admixed with other polymeric materials containing double bonds and/or halogen atoms;

(b) The formation of the membrane by casting the solution onto a metal or glass plate and evaporating the solvent by heating at a temperature generally below 120° C.; and (c) Cross-linking of the membrane by heating the same at a temperature greater than 120° C. By this treatment, the membrane undergoes a cross-linking phenomenon involving the copolymers of the alkenylsulfonate (homocross-linking) and contemporaneously, if present, the other polymer material containing the double bonds and/or halogen atoms (co-cross-linking).

The method of preparing the membranes of the invention is very simple and economical, since it does not require any necessity to operate under non-evaporative conditions. Moreover, the cross-linking of the polymeric materials, which constitute the membrane, occurs within a short time. Finally, according to the present process, no expensive chemical post-treatments are necessary for introducing into the polymeric matrix the active ion-exchange groups.

The organic solvents used for preparing the solution of the copolymer in step (a) of the process of this invention, may be selected from a large group of compounds, so long as they are sufficiently volatile.

Particularly desirable results are obtained when using organic polar compounds, such as simple or substituted amides, sulfones, sulfoxides and alcohols.

The amount of copolymer present in the solution will vary in general from 5% to 60% and preferably from 10% to 25% by weight with respect to the solution.

When operating in the presence of said other polymeric material containing double bonds and/or halogen atoms, the solution may be prepared by using a solvent common to both the copolymer and the other polymeric materials. Alternatively, separate solutions of the two polymeric materials in different solvents may be mixed together, with care being taken, of course, to avoid precipitation of the polymeric materials when the solutions are admixed.

The polymeric material containing double bonds and/or halogen atoms may be selected from a large group of synthetic or natural polymers and/or copolymers. Satisfactory results are obtained with polymeric materials of the class comprising synthetic and natural unsaturated rubbers (styrene rubbers, nitrile rubbers, acrylic rubbers, polybutadienes, polyisoprenes, unsaturated rubbers based on ethylene, propylene and dienes); vinyl chloride and vinylidene chloride polymers and/or copolymers, and the products of partial or complete halogenation of synthetic and natural rubbers and of olefinic polymers and copolymers (halogenated polybutadienes, chlorinated polyethylene, chlorinated ethlylenepropylene copolymers).

A preferred group of polymeric materials comprises polyvinyl chloride and copolymers of butadiene with acrylonitrile. Such polymeric materials are used in admixture with the alkenylsulfonate copolymers in a weight ratio between 0.1 and 10:1, based on the copolymer.

The temperature during the preparation of the solution, must be lower than the temperature at which self-cross-linking of the alkenylsulfonate copolymers begins.

In general, it is preferred to operate at temperatures near room temperature, and at any rate, always below about 120° C.

The transformation of the solution into a membrane is performed in step (b) of the process by first spreading the solution on a glass or metal plate or a plate of any other suitable material having a flat and smooth surface, and then evaporating the solution under controlled conditions.

To this end, the operating temperature, even if lower than that at which self-cross-linking of the alkenylsulfonate copolymer starts must be sufficiently high to allow the removal of the solvent in a relatively short time. For these reasons, it is preferred to operate at temperatures between 30° C. and 100° C., but at any rate always lower than 120° C.

The evaporation time of the solvent on the concentration of the solution, the thickness of the membrane to be prepared and the temperature at which one operates. In general, the time varies from 1 to 60 minutes.

This step of the process is usually carried out by placing a plate of glass or other suitable material, on which the solution of the copolymer has been spread, into a furnace or oven, at the temperature, and for the residence time as indicated above.

The cross-linking of the membrane is carried out in step (c) of the process by heating the membrane at a temperature greater than about 120° C., but preferably between 150° C. and 200° C., for between 10 minutes and 20 hours.

The plate of glass or other suitable material on which, after evaporation of the solvent, there has formed a membrane, is placed into a furnace or oven at the temperature, and for the residence time as indicated above.

After the cross-linking treatment, the membranes are generally preserved in water or are balanced in aqueous NaCl solutions. However, the membranes may also be stored in the dry state without thereby undergoing any permanent deformations or ruptures, while maintaining their initial electrical and mechanical properties unaltered.

According to the process of the invention, it is possible to advantageously prepare cation permoselective membranes, which have at least two dimensions greater than 1 cm., having ($-SO_3M$) groups present in the polymeric chains and arranged in a tridimensional cross-linked structure.

The membranes are in no way damaged or made brittle by the cross-linking treatments.

The membranes according to the invention may be prepared in thicknesses varying over a wide range, in general, greater than $20\mu$, and they may conveniently be used in multi-chamber electrodialysis cells and, in small sizes, in standard ion-exchange columns.

These membranes are solid and homogeneous, and in particular, have a desirable degree of water absorption (generally about 30%).

The mechanical properties of these membranes are excellent and may be further improved by employing reinforcing materials or by using suitable supports or carriers.

For this purpose, natural, artificial or synthetic fibers derived from organic and inorganic polymers, or fabrics prepared from these fibers may be used. The membranes of the invention are characterized by excellent adherence and compatibility to these supports and carriers.

Particularly advantageous results are obtained with fabrics made of glass fibers, polyesters, polyamides, polyolefinic or vinyl polymer fiber and the like.

The membranes according to this invention are characterized by a low electrical resistance and by a high exchange capacity which may be varied over a wide range by regulating the concentration of alkenylsulfonate.

The ion-exchange capacity of the membranes of this invention in general is greater than 0.3 milliequivalents per gram of dry product.

The membranes according to this invention, in the form of the potassium salt ($K^+$), have an electrical conductivity in general, greater than $1 \times 10^{-4}$ ohm$^{-1}$ cm.$^{-1}$. These membranes show a high permoselectivity to cations, as is evidenced by the high potential measured when the membranes are placed into standard cells of the type:

calomel electrode,
saturated KCl, saline bridge,
0.2 molal solution,
membrane according to this invention in the $K^+$ form,
KCl 0.1 molal solution,
saturated KCl, saline bridge,
calomel electrode.

In fact, at 25° C., it is possible to measure a potential of concentration very close to the ideal thermodynamic value of 16.08 mv. In other words, the membranes according to the invention are characterized by transport numbers very near to unity.

The membranes of the invention may be used in all those processes in which ion-exchange occurs, as for example, in the demineralization of water, the recovery and concentration of radioactive materials or light metals, the purification of proteins, and sugar solutions as well as in demineralizing processes in general. More particularly, the membranes of this invention may be advantageously used for demineralization of seawater and brackish waters.

DESCRIPTION OF THE PREFERRED EMBODIMENTS

The following examples are given to better illustrate, however, without in any way limiting, the inventive idea of the present invention.

Example 1

170 ml. of dimethylsulfoxide and 78 g. of sodium vinyl sulfonate were introduced into a three-necked, 500 ml. flask, fitted with a mechanical stirrer under a nitrogen stream and at room temperature. The mixture was stirred to obtain a clear solution. Thereafter, 13.3 ml. of acrylonitrile, 16 ml. of vinylidene chloride and finally a solution of 1 g. of $(NH_4)_2S_2O_8$ in 10 ml. of dimethylsulfoxide were added thereto. The flask was sealed and then introduced into a thermostatic bath at 50° C. After 24 hours, the viscous solution was poured into about 1,000 ml. of acetic acid, and the thus obtained solid product was purified by dissolution in dimethylformamide and precipitation from a 1:1 mixture of acetone/heptane.

A powdery product, which after dyeing under reduced pressure amounted to 33 g., was thereby obtained.

The elemental analysis yielded the following results: S: 10.88% by weight; N: 8.58% by weight; Cl: 17.05% by weight, which correspond to the following molar composition:

| | Mole percent |
|---|---|
| Sodium vinyl sulfonate | 28.5 |
| Acrylonitrile | 51.4 |
| Vinylidene chloride | 20.1 |

The inherent viscosity, determined at 30° C. in dimethyl formamide (0.25 g./100 ml. of solvent) was: $\eta_{in}=0.58$ dl./g.

This terpolymer was soluble in dimethylformamide, dimethylsulfoxide, water and methanol and insoluble in acetic acid, ketones, aliphatic and aromatic hydrocarbons and ethers.

By evaporating a solution of this copolymer in dimethylformamide at 110° C.–120° C., there was obtained a film, which under further heating at 130° C.–140° C. for 5 hours became insoluble and scarcely swellable in dimethylformamide.

A sample of this cross-linked film was subjected to dyeing under the following conditions:

Ratio terpolymer/dyeing bath _____ 1:100
Dye concentration _____percent by weight__ 0.5
Temperature _____° C__ 90–95
Time _____hour__ 1

The dyeing bath was made alkaline by adding 1% by weight of NaOH based on the weight of the terpolymer. The folowing dyes were used:

Red Basacryl GL         Basic Red 29
Blue Basacryl GL        Basic Blue 54

After dyeing, the fims were colored with solid shapes which were not altered even after prolonged washings with water and soap and solvents.

Example 2

25 ml. of dimethylsulfoxide and 13 g. of sodium vinylsulfonate were introduced into a three-necked, 100 ml. flask fitted with a mechanical stirrer and dropping funnel under a nitrogen atmosphere and at room temperature. The mixture was stirred to obtain a clear solution and then 6.7 ml. of vinylidene chloride, 7.3 ml. of methylvinylketone and 0.25 g. of $(NH_4)_2S_2O_8$ dissolved in 5 ml. of dimethylsulfoxide were added thereto.

The flask was sealed and placed into a thermostatic bath at 50° C.

After 15 minutes, an additional 4.5 ml. of methylvinylketone were added over a period of 1 hour.

The resulting mixture was stirred while in the bath for 45 minutes and the viscous solution which resulted was poured into 200 ml. of water containing 5 g. of NaOH.

The thus produced solid product was washed first with n-butyl alcohol and then with n-heptane, after which it was dried under a reduced pressure. The yield amounted to 1.1 g.

Elemental analysis of the product gave the following results: S: 6.7% by weight and Cl: 21% by weight. These results correspond to the following molar composition.

Mole percent
Sodium vinylsulfonate _____ 21.1
Vinylidene chloride _____ 30.8
Methylvinyl ketone _____ 48.1

The product had an inherent viscosity, as determined at 30° C. in dimethylformamide, of $\eta_{in}$=0.52 dl./g. The copolymer was soluble in dimethylformamide, dimethylsulfoxide and water, and insoluble in aliphatic and aromatic hydrocarbons and ethers.

By evaporating a dimethylformamide solution of the copolymer at 80–90° C., there was obtained a film which, after further heating at 140° C.–150° C. for 5 hours resulted in a product which was insoluble and hardly swellable in dimethylformamide.

This film had properties which were very similar to those of the films obtained in Example 1.

Example 3

Example 2 was repeated starting with 20 ml. of dimethylsulfoxide, 7.8 g. of sodium vinylsulfonate, 2 g. of vinylidene chloride and 3.3 g. of dichlorovinylacetate ($CHCl_2$—$COOCH$=$CH_2$). After the addition of 0.2 g. of $(NH_4)_2S_2O_8$ dissolved in 5 ml. of dimethylsulfoxide, the mixture was polymerized at 50° C. for 6 hours.

The resulting viscous solution was poured into about 100 ml. of acetic acid thereby obtaining a white powdery product, which, after drying under a reduced pressure, amount to 7.5 g. and had an inherent viscosity $\eta_{in}$ of 0.12 dl./g.

The elemental analysis of the product yielded the following results: S: 17.1% by weight and Cl: 18.62% by weight. These results correspond to the following molar composition:

Mole percent
Sodium vinylsulfonate _____ 62.2
Vinylidene chloride _____ 22.8
Dichlorovinylacetate _____ 15.0

The copolymer was soluble in dimethylsulfoxide, dimethylformamide and water, and insoluble in methanol, toluene and acetic acid.

After evaporating a dimethylformamide solution of the copolymer at 110° C., there was obtained a film which, under further heating at 140° C. for 5 hours resulted in a product which was insoluble and hardly swellable in dimethylformamide.

The properties of this film were quite similar to those of the films of the preceding examples.

Example 4

Example 3 was repeated using 33 g. of β-hydroxyethylacrylate instead of dichlorovinylacetate.

After 20 minutes of polymerization at 50° C., the obtained copolymer was recovered as in the preceding example. The product, dried under a reduced pressure, amount to 7 g. and had an inherent viscosity (determined at 30° C. in water; 0.25 g./100 ml.) of $\eta_{in}$=0.43 dl./g.

Elemental analysis of the product yielded the following data: S: 12.1% by weight and Cl: 13.48% by weight. These results correspond to the following molar composition:

Mole percent
Sodium vinyl sulfonate _____ 44.5
Vinylidene chloride _____ 22.4
β-Hydroxyethylacrylate _____ 33.1

The copolymer was soluble in water and dimethylsulfoxide; insoluble in dimethylformamide, alcohols, ethers and acetic acid.

A film obtained by evaporating an aqueous solution of the copolymers, and thereafter heated at 140° C. for 5 hours resulted in a product which was insoluble and hardly swellable in water.

Samples of the film subjected to dyeing as described in the preceding examples, resulted in stably colored products, dyeings being resistant to washings with soaps and solvents.

Example 5

Example 3 was repeated using 1.04 g. of styrene instead of β-hydroxyethylacrylate. After 70 hours of polymerization at 30° C. under stirring, the suspension which was obtained was poured into about 100 ml. of acetic acid.

After filtration and drying under a reduced pressure, 2 g. of a white powdery polymer having an inherent viscosity (determined at 30° C., in dimethylformamide 0.25 g./100 ml.): $\eta_{in}$ of 0.46 dl./g. were obtained.

Elemental analysis of the product yielded the following results: S: 7.45% by weight and Cl: 16.82% by weight. These results correspond to the following molar composition:

Mole percent
Sodium vinylsulfonate _____ 21.2
Vinylidene chloride _____ 21.8
Styrene _____ 57.0

The copolymer was soluble in dimethylformamide and insoluble in water, acetic acid and methanol.

A film, cross-linked as described in the preceding examples, was subjected to dyeing tests, and resulted in stably colored products.

Example 6

13 g. of sodium vinylsulfonate, 30 ml. of dimethylsulfoxide, 1.85 g. of acrylonitrile, 2.3 g. of α-chloroacrylonitrile and finally a solution of 0.5 g. of $(NH_4)_2S_2O_8$ in 5 ml. of dimethylsulfoxide were introduced into a 100 ml. flask.

After 20 hours of polymerization at 50° C., the obtained material was poured into about 200 ml. of acetic acid. The thus obtained solid product, after dissolution in dimethylformamide, precipitation in benzene and drying under a reduced pressure amounted to 4.5 g. and had an inherent viscosity (determined at 30° C. in dimethylformamide 0.25 g./100 ml.): $\eta_{in}$ of 0.32 dl./g.

The elemental analysis yielded the following results: S: 6.4% by weight; N: 15.07% by weight and Cl: 15.20% by weight. These results correspond to the following molar composition:

| | Mole percent |
|---|---|
| Sodium vinylsulfonate | 15.8 |
| Acrylonitrile | 50.4 |
| α-Chloroacrylonitrile | 33.8 |

This copolymer was soluble in dimethylsulfoxide, dimethylformamide, water and methanol and insoluble in aromatic hydrocarbons, acetic acid and ethers.

After evaporation of a dimethylformamide solution of the copolymer at 120° C., and further heating at 140° C. for 5 hours, a film which was insoluble and hardly swellable in dimethylformamide was obtained.

Example 7

12 g. of sodium allylsulfonate, 30 ml. of dimethylsulfoxide, 1.5 g. of acrylonitrile, 2.5 g. of vinylidenechloride and, finally, a solution of 0.2 g. of $(NH_4)_2S_2O_8$ in 5 ml. of dimethylsulfoxide were introduced into a 200 ml. flask. After 72 hours of polymerization at 50° C., the thus obtained solution was poured into about 200 ml. of warm ethyl alcohol. The solid product thus obtained was repeatedly washed with ethyl alcohol and then dried under a reduced pressure whereby there were obtained 1.5 g. of a copolymer having an inherent viscosity (determined at 30° C. in dimethylformamide 0.25 g./100 ml.) of $\eta_{in}$=0.15 dl./g.

Elemental analysis yielded the following results: S: 13.8% by weight; N: 5.47% by weight and Cl: 12.73% by weight. These results correspond to the following molar composition:

| | Mole percent |
|---|---|
| Sodium allylsulfonate | 43.0 |
| Acrylonitrile | 39.3 |
| Vinylidene chloride | 17.7 |

This copolymer was soluble in water, dimethylsulfoxide and dimethylformamide; insoluble in aliphatic and aromatic hydrocarbons and ethers.

The cross-linked film obtained from the copolymer had the same properties as the films prepared according to the preceding examples.

Example 8

(A) Preparation of the copolymer.—Into a three-necked 100 ml. flask, fitted with a stirrer, there were introduced under a nitrogen atmosphere, 20 ml. of dimethylsulfoxide, 13 g. of sodium vinylsulfonate and 2.4 ml. of vinylidene chloride. This mixture was then stirred until a clear solution was obtained. 0.5 g. of $(NH_4)_2S_2O_8$, dissolved in 5 ml. of dimethylsulfoxide, were then admixed therewith.

The reaction was then immersed into a thermostatic bath kept at 50° C. Then, over a 24 hour period, 36 ml. of a solution containing 8.5 ml. of vinylidene chloride in 27.5 ml. of dimethylsulfoxide were added to the mixture.

The solution was poured into about 200 ml. of acetic acid and the thus obtained copolymer was repeatedly washed with acetic acid. After drying under a reduced pressure, 3.5 g. of copolymer were obtained.

Elemental analysis yielded the following results: S: 12.68% and Cl: 35.5%. These results correspond to the following molar composition: Sodium vinylsulfonate =44.2% and vinylidene chloride=55.8%.

The inherent viscosity of the copolymer, determined in dimethylformamide at 30° C., was $\eta_{in}$=0.16 dl./g.

The copolymer was soluble in dimethylformamide, dimethylsulfoxide, and water and insoluble in methanol, acetic acid, ketones, aliphatic and aromatic hydrocarbons and ethers.

(B) Preparation of the membrane.—10 g. of the copolymer prepared as indicated in part (A) above, in admixture with 10 g. of polyvinyl chloride having an inherent viscosity in cyclohexanone at 30° C. (solution of 0.25 g. of polymer in 100 cc. of solvent) equal to 1.5 dl./g., were dissolved in 120 cc. of dimethylformamide at 40° C.

The resulting solution was spread on a flat glass plate by means of a film spreader and then put into an oven at 100° C.

After 30 minutes, the temperature of the oven was brought up to 130° C. and maintained thereat for about 3 hours. The membrane thus obtained was highly cross-linked, insoluble and barely swellable in any organic or inorganic solvents. The membrane was then immersed for 48 hours in an aqueous 1 N NaOH solution.

After washing with water, there was obtained a membrane which had the properties listed in the following Table I:

TABLE I

| Properties | Procedure* | Value |
|---|---|---|
| Electrical resistance | (1) | 61 ohm sq. cm. |
| Transport number $t_{Na^+}$ | (2) | 0.96. |
| Exchange capacity | (2) | 1.7 meq./g. |
| Water absorption | (4) | 22% py weight. |

*Notes:
(1) Measured in an aqueous solution 0.5 N NaCl at 25°±0.1° C., in accordance with the process described in "Test Manual For Permoselective Membranes," Method 601-1, page 156 O.S.W., Report No. 77.
(2) Measured in an aqueous solution 0.5/0.25 N NaCl, in accordance with the process described in "Test Manual for Permoselective Membranes," Method 602-1, page 163 O.S.W., Report No. 77.
(3) Procedure described in "Test Manual for Permoselective Membranes," Method 502-1, page 132 O.S.W., Report No. 77.
(4) Procedure described in "Test Manual for Permoselective Membranes," Method 412-1, page 120 O.S.W., Report No. 77.

Example 9

10 g. of the copolymer prepared according to the procedure described in Example 8(A), in admixture with 10 g. of a butadiene-acrylonitrile copolymer (containing about 50 mole percent of acrylonitrile) were dissolved in 120 cc. of dimethylformamide at 40° C.

The solution was then spread onto a flat glass plate by means of a film-spreader and the plate was placed into an oven at 100° C.

After 30 minutes, the temperature in the oven was raised to 130° C. and maintained thereat for 3 hours.

The thus obtained membrane was highly cross-linked, insoluble and barely swellable in any organic or inorganic solvents.

The membrane was then immersed in an aqueous 1 N NaOH solution for 48 hours.

After washing with water, there was obtained a membrane having the properties reported in Table II:

TABLE II

| Properties | Procedure* | Value |
|---|---|---|
| Electrical resistance | (1) | 4.54 ohm sq. cm. |
| Transport number $t_{Na^+}$ | (2) | 0.98. |
| Exchange capacity | (3) | 1.7 meq./g. |
| Water absorption | (4) | 24% by weight. |

*See notes to Table I.

Example 10

(A) Preparation of the polymer.—Into a three-necked, 100 ml. flask, fitted with a mechanical stirrer and dropping funnel, 25 ml. of dimethylsulfoxide and 13 g. of sodium vinylsulfonate were introduced, under a nitrogen atmosphere and at room temperature. This mixture was stirred until a clear solution was obtained. To this solution, 4.4 ml. of acrylonitrile, 4 ml. of vinylidene chloride and a solution containing 0.25 g. of $(NH_4)_2S_2O_8$ in 5 ml. of dimethylsulfoxide were then admixed. Thereafter, 2.2 ml. of acrylonitrile were introduced into the dropping funnel.

The flask was then closed and immersed into a thermostatic bath at a temperature of 50° C.

This mixture was then stirred for 15 minutes, after which, the acrylonitrile was added dropwise over a 90 minute period.

15 minutes after the acrylonitrile addition, the viscous solution was poured into about 200 ml. of acetic acid and the solid product thus obtained was purified by dissolution in dimethylformamide and subsequent re-precipitation by means of a 1:1 acetone/heptane mixture.

A rubbery product was obtained which, after drying under reduced pressure, amounted to 6 grams.

Elemental analysis yielded the following results: S: 6.45%; N: 11.98% and Cl: 20.85%. These results correspond to the following molar composition: sodium vinylsulfonate: 14.9%; acrylonitrile: 63.5% and vinylidene chloride: 21.6%.

The inherent viscosity, determined in dimethylformamide at 30° C. (concentration: 0.25 g./100 ml.), was $\eta_{in}$=2.7 dl./g.

The polymer was soluble in dimethylformamide, dimethylsulfoxide and insoluble in acetic acid, methanol, ketones, aliphatic and aromatic hydrocarbons and esters.

(B) Preparation of membrane.—20 g. of the terpolymer prepared as described above in part (A) were dissolved in 100 cc. of dimethylformamide at 40° C. The solution was then spread by means of a film spreader onto a flat glass plate and placed in an oven at 110° C. After 30 minutes, the temperature of the oven was raised to 160° C. and maintained thereat for about 5 hours. The thus obtained membrane was highly cross-linked and insoluble in any organic or inorganic solvents.

The membrane was then immersed for 48 hours in an aqueous 1 N NaOH solution.

After washing in water, a membrane having the properties reported in the following Table III was obtained.

TABLE III

| Properties | Procedure* | Value |
|---|---|---|
| Electrical resistance | (1) | 2.2 ohm sq. cm. |
| Transport number $t_{Na}+$ | (2) | 0.98. |
| Exchange capacity | (3) | 2.0 meq./g. |
| Water absorption | (4) | 31.2% by weight. |

*See notes to Table I.

Example 11

20 g. of the terpolymer prepared according to the procedure described in Example 8(A), were dissolved in 100 cc. of dimethylformamide at 40° C.

A net made of polyethyleneterephthalate and having a free area of 52.4% and 73 meshes per sq. cm. was immersed in the solution.

The net, impregnated with the solution, was put into an oven for 20 minutes at 110° C.

The temperature of the oven was then raised to 160° C. and maintained thereat for about 8 hours.

The resulting membrane was highly cross-linked and insoluble in any organic or inorganic solvents.

This membrane was then immersed for 48 hours in an aqueous 1 N NaOH solution. After washing in water, there was obtained a membrane, the properties of which are recorded in the following Table IV:

TABLE IV

| Properties | Procedure* | Value |
|---|---|---|
| Electrical resistance | (1) | 4.5 ohm sq. cm. |
| Transport number $t_{Na}+$ | (2) | 0.99. |
| Exchange capacity | (3) | 2.0 meq./g.** |
| Water absorption | (4) | 27.4% by weight. |

*See notes to Table I.
**Calculated on the dry resin.

Variations and modifications can, of course, be made without departing from the spirit and scope of the invention.

Having thus described our invention, what we desire to secure by Letters Patent and hereby claim is:

1. Linear, homogeneous copolymers of alkenylsulfonates consisting essentially of, in chemically combined form:

(A) at least one alkenylsulfonate of the formula:

$$[CH_2=CH-SO_3]_zM,$$

wherein M is a mono-, di- or trivalent metal ion or an ammonium ion and Z, which represents the valence of M, is respectively 1, 2 or 3;

(B) vinylidene chloride, α-chloroacrylonitrile or a mixture thereof;

(C) and optionally, at least one other monomer copolymerizable therewith and containing a $CH_2=C<$ group.

2. A copolymer according to claim 1, wherein M is a metal ion and is selected from the group consisting of lithium, sodium, potassium, calcium, magnesium, zinc, mercury, aluminum and iron.

3. A copolymer according to claim 1, wherein monomer (C) is present, and is selected from the group consisting of acrylic acid, methyacrylic acid, esters, amides and nitriles thereof; vinyl esters and halogenated derivatives thereof; vinyl and vinylidene ketones; styrene, α-methylstyrene and mixtures thereof; and diolefins and halogenated derivatives thereof.

4. A copolymer according to claim 3, wherein the monomer (C) is acrylonitrile, dichlorovinylacetate, β-hydroxyethylacrylate, methylvinyl ketone or styrene.

5. A copolymer according to claim 1, constituted by from 5 to 80 mole percent of alkenylsulfonate (A), from 5 to 95 mole percent of (B) and from 0 to 90 mole percent of monomer (C).

6. A copolymer according to claim 5, constituted by from 10 to 70 mole percent of alkenylsulfonate (A), from 10 to 60 mole percent of (B) and from 0 to 60 mole percent of monomer (C).

7. A copolymer according to claim 1, and having an inherent viscosity (at 30° C., in dimethylformamide at a concentration 0.25 g./100 ml. of solvent) between 0.05 and 4.0 dl./g.

8. A self-cross-linked polymeric material prepared by heating a copolymer according to claim 1, at a temperature above about 120° C.

9. A self-cross-linked polymeric material according to claim 8, wherein the copolymer is heated to a temperature between about 150° C. and 200° C.

10. A self-cross-linked polymeric material prepared by heating a copolymer according to claim 1, at a temperature above about 120° C., in admixture with a polymeric material containing double bonds, halogen atoms or both.

11. A cation permoselective membrane formed of a self-cross-linked polymeric material according to claim 8, optionally admixed with other polymeric materials containing double bonds, halogen atoms or both.

12. A cation permoselective membrane according to claim 10, wherein the copolymer is constituted by from 5 to 80 mole percent of alkenylsulfonate (A), from 5 to 95 mole percent of (B) and from 0 to 90 mole percent of monomer (C).

13. A cation permoselective membrane according to claim 12, wherein the copolymer is constituted 10 to 70 mole percent of alkenylsulfonate (A), from 10 to 60 mole percent of (B) and from 0 to 60 mole percent of monomer (C).

14. A cation permoselective membrane according to claim 11, wherein said other polymeric material is selected from the group consisting of synthetic and natural unsaturated rubbers, vinyl chloride and vinylidene chloride polymers and copolymers; halogenated synthetic and natural rubbers and halogenated olefinic polymers and copolymers.

15. A cation permoselective membrane according to claim 14, wherein the weight ratio of said polymeric material is between 0.1 and 10, based on the copolymer.

16. A cation permoselective membrane according to claim 15, wherein said polymeric material is polyvinylchloride.

17. A cation permoselective membrane according to claim 15, wherein said polymeric material is a butadiene-acrylonitrile copolymer rubber.

References Cited
UNITED STATES PATENTS

| | | | |
|---|---|---|---|
| 3,178,385 | 4/1965 | Dinges et al. | 260—29.4 |
| 3,423,278 | 1/1969 | Hodgdon et al. | 161—165 |
| 3,730,872 | 5/1973 | Marze | 204—252 |
| 3,732,190 | 5/1973 | Balle et al. | 260—78.5 R |

MELVIN GOLDSTEIN, Primary Examiner

U.S. Cl. X.R.

260—79.3 MU

PO-1050
(5/69)

UNITED STATES PATENT OFFICE
CERTIFICATE OF CORRECTION 201-33
Patent No. 3,813,354                    Dated May 28, 1974

Inventor(s) Antonio Chiolle et al

It is certified that error appears in the above-identified patent and that said Letters Patent are hereby corrected as shown below:

Column 1, line 11:  "26,727/71" should read -- 26,727 A/71 --.

Column 5, line 61:  "small" should read -- smaller --.

Column 8, line 2:   "amount" should read -- amounted --.
Column 8, line 30:  "amount" should read -- amounted --.
Column 8, line 45:  "copolymers," should read -- copolymer, --.

Column 10, Table I, line 3:  "(2)" should read -- (3) --.

Column 12, line 66:  "constituted" should read -- constituted by --.

Signed and sealed this 17th day of September 1974.

(SEAL)
Attest:

McCOY M. GIBSON JR.
Attesting Officer

C. MARSHALL DANN
Commissioner of Patents